(12) United States Patent
Matsumoto (10) Patent No.: US 10,656,716 B2
(45) Date of Patent: May 19, 2020

(54) CONTROL DEVICE, INPUT SYSTEM, AND CONTROL METHOD (71) Applicant: DENSO TEN Limited, Kobe-shi, Hyogo (JP)

(72) Inventor: Shinsuke Matsumoto, Kobe (JP)

(73) Assignee: DENSO TEN Limited, Kobe-shi (JP)

( * ) Notice: Subject to any disclaimer, the term of this patent is extended or adjusted under 35 U.S.C. 154(b) by 6 days.

(21) Appl. No.: 16/028,501

(22) Filed: Jul. 6, 2018

(65) Prior Publication Data
US 2019/0056787 A1 Feb. 21, 2019

(30) Foreign Application Priority Data

Aug. 16, 2017 (JP) ................. 2017-157252

(51) Int. Cl.
*G06F 3/041* (2006.01)
*G06F 3/042* (2006.01)
*G06F 3/01* (2006.01)
*G06F 3/0488* (2013.01)

(52) U.S. Cl.
CPC ............. *G06F 3/016* (2013.01); *G06F 3/041* (2013.01); *G06F 3/04886* (2013.01); *G06F 2203/014* (2013.01); *G06F 2203/04105* (2013.01)

(58) Field of Classification Search
CPC .......... G06F 3/041; G06F 3/045; G06F 3/043; G06F 3/042; G09G 5/08
See application file for complete search history.

(56) References Cited

U.S. PATENT DOCUMENTS

| | | | |
|---|---|---|---|
| 2009/0135150 A1* | 5/2009 | Takashima | G06F 3/041 345/173 |
| 2009/0227296 A1* | 9/2009 | Kim | G06F 3/016 455/566 |
| 2014/0071071 A1* | 3/2014 | Hirose | G06F 3/0488 345/173 |
| 2017/0168574 A1* | 6/2017 | Zhang | G06F 3/016 |
| 2018/0121005 A1* | 5/2018 | Aberg | G06F 3/0488 |

FOREIGN PATENT DOCUMENTS

| | | |
|---|---|---|
| JP | 2012-108949 A | 6/2012 |
| JP | 2013-109429 A | 6/2013 |

* cited by examiner

*Primary Examiner* — Pegeman Karimi
(74) *Attorney, Agent, or Firm* — Oliff PLC

(57) ABSTRACT

A control device according to the embodiment includes an operation detecting unit and a driving unit. The operation detecting unit detects a pressing operation onto an operation surface of a panel having the operation surface. The driving unit drives a vibration element attached to the panel to vibrate the panel. Moreover, the driving unit generates an initial vibration having a lower frequency than that of a main vibration in advance of the main vibration when the pressing operation is detected by the operation detecting unit.

8 Claims, 6 Drawing Sheets

CONTROL DEVICE, INPUT SYSTEM, AND CONTROL METHOD

CROSS-REFERENCE TO RELATED APPLICATION

This application is based upon and claims the benefit of priority of the prior Japanese Patent Application No. 2017-157252, filed on Aug. 16, 2017, the entire contents of which are incorporated herein by reference.

FIELD

The embodiment discussed herein is directed to a control device, an input system, and a control method.

BACKGROUND

There is a conventional input system that gives a feel to a user to make the user recognize that the input system has received a user's operation onto an operation surface of a panel. In regard to the input system, there has been proposed a technology for generating a click feel by vibrating a vibration element at a voltage having a waveform obtained by applying an envelope to a sine wave when the operation surface of the panel is manipulated (see, e.g., Japanese Laid-open Patent Publication No. 2013-109429).

However, the conventional technology has room for improvement in improving an operational feeling to be given to a user when the same operational feeling as an operational feeling onto a mechanical switch is given to the user.

SUMMARY

A control device according to the embodiment includes an operation detecting unit and a driving unit. The operation detecting unit detects a pressing operation onto an operation surface of a panel having the operation surface. The driving unit drives a vibration element attached to the panel to vibrate the panel. Moreover, the driving unit generates an initial vibration having a lower frequency than that of a main vibration in advance of the main vibration when the pressing operation is detected by the operation detecting unit.

BRIEF DESCRIPTION OF DRAWINGS

A more complete appreciation of the present application and many of the attendant advantages thereof will be readily obtained as the same becomes better understood by reference to the following detailed description when considered in connection with the accompanying drawings, wherein.

DESCRIPTION OF EMBODIMENT

Hereinafter, a control device, an input system, and a control method according to an embodiment will be explained in detail with reference to the accompanying drawings. In addition, the illustrative embodiment disclosed below is not intended to limit the present invention.

Figure 1A:
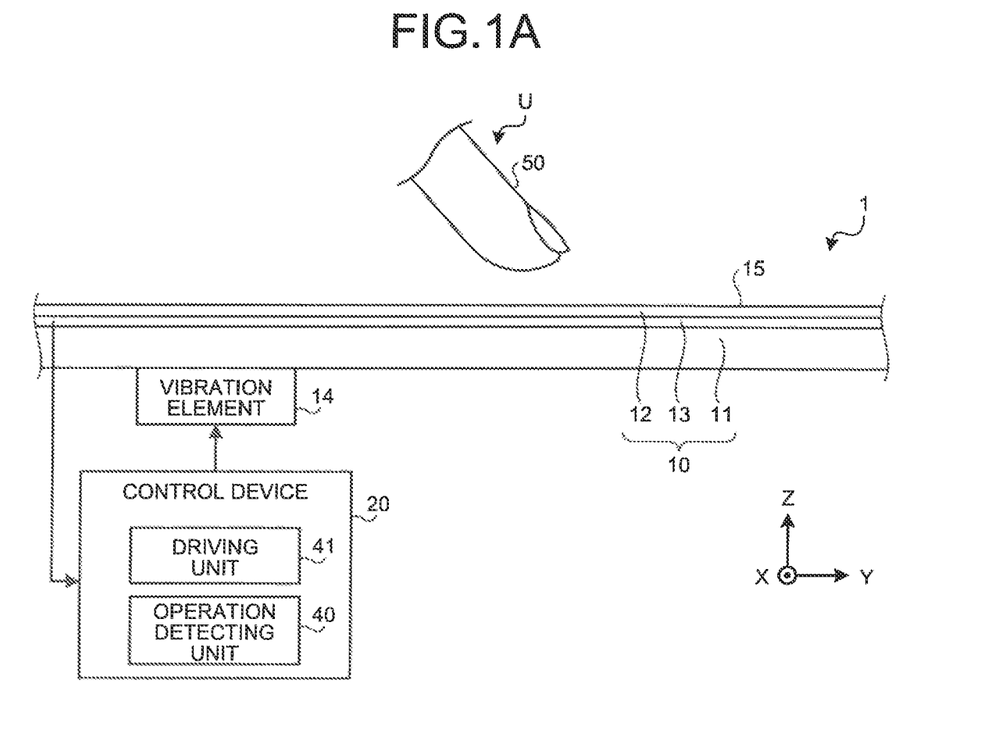
FIG. 1A is a diagram illustrating a configuration example of an input system.

First, a configuration example of an input system 1 according to the embodiment will be described by using FIG. 1A. FIG. 1A is a diagram illustrating a configuration example of the input system 1. As illustrated in FIG. 1A, the input system 1 according to the embodiment includes a panel 10, a vibration element 14, and a control device 20.

The panel 10 includes a support plate 11, a protective layer 12, and a pressure sensor 13. The pressure sensor 13 and the protective layer 12 are sequentially laminated on the support plate 11. The protective layer 12 is formed of, for example, a resin member such as a resin film. The surface of the protective layer 12 is an operation surface 15 of the panel 10.

The pressure sensor 13 is a sensor, e.g., a pressure-sensitive-resistance touch sensor, which can detect a contact position and an operational pressure onto the operation surface 15 of the panel 10. The contact position and operational pressure are manipulated by a user U. The vibration element 14 is attached to the panel 10, and is vibrated with a driving voltage Vo output from the control device 20.

The control device 20 drives the vibration element 14 to vibrate the panel 10 in response to a user's pressing operation (hereinafter, may be referred to as user's operation) onto the operation surface 15 of the panel 10. The control device 20 includes an operation detecting unit 40 and a driving unit 41.

The operation detecting unit 40 detects a user's operation on the basis of the contact position detected by the pressure sensor 13. The driving unit 41 drives the vibration element 14 to vibrate the panel 10 on the basis of a detection result of the user's operation detected by the operation detecting unit 40.

When the user's operation is detected by the operation detecting unit 40, the driving unit 41 drives the vibration element 14 to vibrate the panel 10 so as to give the same operational feeling as an operational feeling onto a mechanical switch to the user U. Hereinafter, although it will be explained that the user's operation is performed by a finger 50 of the user U, the user's operation may be performed by a stylus pen etc.

Figure 1B:
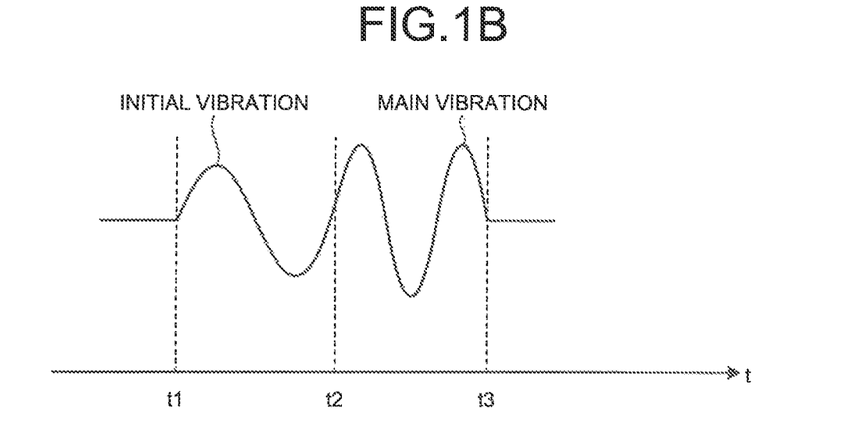
FIG. 1B is a diagram illustrating the outline of a control method.

FIG. 1B is a diagram illustrating the outline of a control method. An example of vibrations of the panel 10 is illustrated in FIG. 1B. As illustrated in FIG. 1B, when a pressing operation is detected by the operation detecting unit 40, the control method according to the embodiment generates an initial vibration having a low frequency than that of a main vibration (times t1 to t2), and then generates the main vibration with respect to the panel 10 (times t2 to t3).

An initial vibration is a vibration for showing the user U a repulsive force when pressing an actual mechanical switch. In other words, an initial vibration can allow the panel 10 to provide a sense pushing a mechanical switch to the user U.

A main vibration is a vibration for giving a click feel of the mechanical switch to the user U. In other words, the control method according to the embodiment does not only give a click feel by using a main vibration, but also gives a depth feel of the mechanical switch by using an initial vibration in advance of the main vibration.

As a result, it is possible to give the same operational feeling as an operational feeling onto an actual mechanical switch to the user U, and thus it is possible to improve an operational feeling to be given to the user U.

Figure 2:
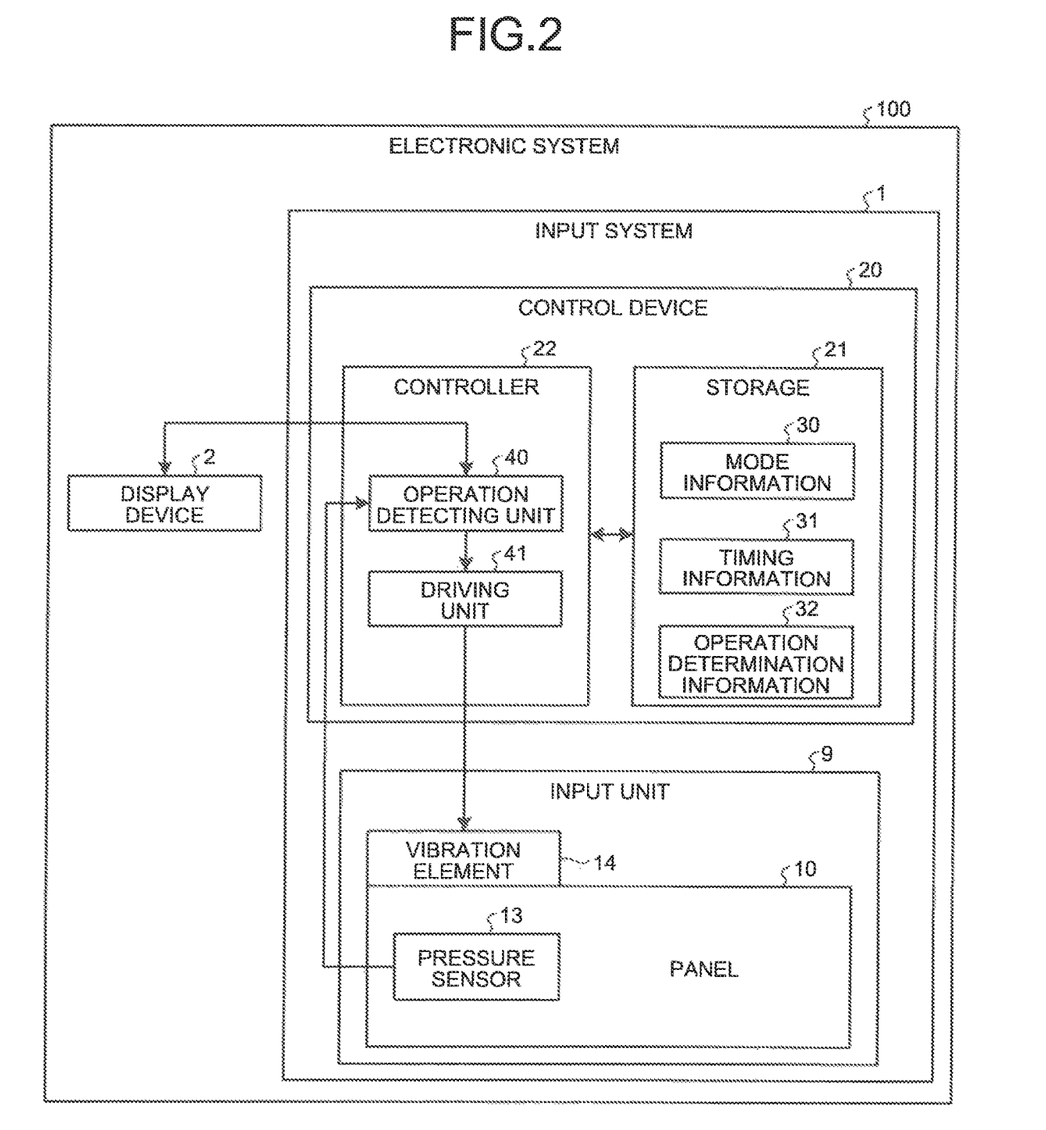
FIG. 2 is a block diagram illustrating an electronic system.

Next, the configuration of an electronic system 100 including the input system 1 according to the embodiment will be described by using FIG. 2. FIG. 2 is a block diagram illustrating the electronic system 100.

The electronic system 100 illustrated in FIG. 2 is, for example, an in-vehicle system mounted on a vehicle. However, the embodiment is not limited to such an example. The electronic system may be a computer system etc. including PC (personal computer).

The electronic system 100 includes the input system 1 and a display device 2. The input system 1 includes an input unit 9 and the control device 20. The input unit 9 includes the panel 10 and the vibration element 14 described above. The pressure sensor 13 of the panel 10 is, for example, a pressure-sensitive-resistance touch sensor. However, the pressure sensor 13 may be a sensor other than the pressure-sensitive-resistance sensor.

The vibration element 14 is attached to the front face or back face of the panel 10. The vibration element 14 is, for example, a linear resonance actuator. However, the vibration element 14 may be a piezoelectric element etc. Although it is not illustrated, the input unit 9 may include an amplifying unit that amplifies a driving voltage output from the control device 20 and outputs the amplified voltage to the vibration element 14.

Figure 3:
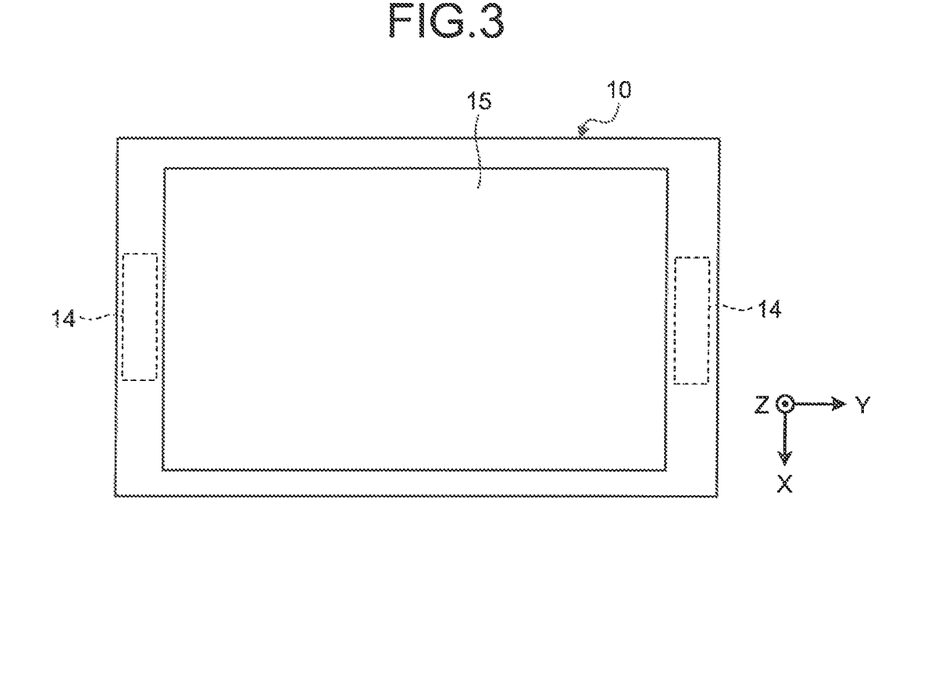
FIG. 3 is a diagram illustrating an arrangement example of a vibration element.

FIG. 3 is a diagram illustrating an arrangement example of the vibration element 14 according to the embodiment. In the example illustrated in FIG. 3, the input unit 9 includes two vibration elements 14. The two vibration elements 14 are arranged around the operation surface 15. The number of the vibration elements 14 is not limited to two. Therefore, the number may be one, or may be three or more. Furthermore, the arrangement of the vibration elements 14 is not limited to the example illustrated in FIG. 3. For example, the vibration element 14 may be arranged at a position (e.g., the central portion of the operation surface 15) corresponding to the operation surface 15 of the panel 10.

Returning to FIG. 2, the control device 20 will be described. The control device 20 includes a storage 21 and a controller 22. The storage 21 stores therein mode information 30, timing information 31, and operation determination information 32. The mode information 30 is, for example, information indicating the type of vibration modes set via an input unit not illustrated. One of a fixed mode and a variation mode is set as the type of a vibration mode.

A fixed mode is a mode for vibrating the panel 10 in a fixed vibration pattern in response to a pressing operation of the user U onto the operation surface 15 of the panel 10. A variation mode is a mode for vibrating the panel 10 in a vibration pattern according to the state of a pressing operation.

The timing information 31 is information for defining the occurrence time of each vibration, and includes information indicating first to third times T1 to T3 to be described later. The operation determination information 32 is information for determining a user's operation, and includes information indicating first to third threshold values Pth1 to Pth3 corresponding to operational pressures of the user U onto the operation surface 15.

The controller 22 includes the operation detecting unit 40 and the driving unit 41. The operation detecting unit 40 acquires detected information indicating a contact position and an operational pressure of the user U onto the operation surface 15 that are detected by the pressure sensor 13. Furthermore, the operation detecting unit 40 acquires the operation determination information 32 stored in the storage 21.

The operation detecting unit 40 detects an operation of the user U onto the operation surface 15 of the panel 10 on the basis of the detected information acquired from the pressure sensor 13 and the operation determination information 32 acquired from the storage 21. The operation detecting unit 40 can detect various operations such as a pressing operation and a slide operation of the user U.

For example, when the contact position of the user U onto the operation surface 15 continues to be at the same position and the operational pressure is not less than the first threshold value Pth1, the operation detecting unit 40 can determine that there is a pressing operation of the user U onto the operation surface 15.

When the pressing operation is detected by the operation detecting unit 40, the driving unit 41 drives the vibration element 14 to vibrate the panel 10 with an initial vibration W1 and then to vibrate the panel 10 with a main vibration W2 having a higher frequency than that of the initial vibration W1.

Figure 4:
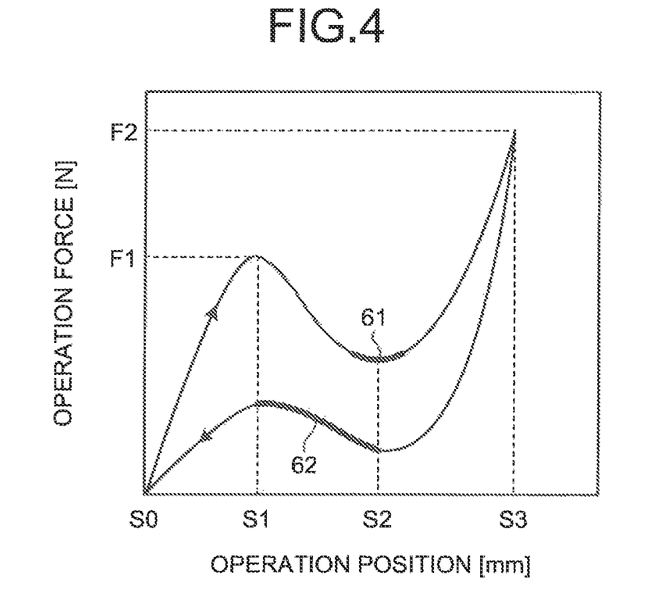
FIG. 4 is a diagram illustrating operational feeling characteristics for a mechanical switch.

Herein, a relationship between an operating force and an operation position onto a mechanical switch will be described. FIG. 4 is a diagram illustrating operational feeling characteristics onto a mechanical switch. In FIG. 4, an operating force is a pressing force onto an operation surface of a mechanical switch, and an operation position is a push position onto the mechanical switch in a stroke direction.

As illustrated in FIG. 4, when a pressing operation of the user U onto the mechanical switch is started, the user U needs to increase an operating force from an operation position S0 corresponding to push-start onto the mechanical switch to an operation position S1. When the operating force reaches F1 at the operation position S1, a necessary operating force is decreased up to an operation position S2, and then the necessary operating force is increased. After that, the operating force reaches an operation position S3 corresponding to an ending position.

Furthermore, when the user U starts an operation for releasing the finger 50 from the mechanical switch from the operation position S3, a necessary operating force is suddenly decreased from F2, but the necessary operating force is increased from the operation position S2 to the operation position S1. The reason is because a rubber switch built in the mechanical switch is pushed down and then is returned. The user U instantaneously feels a pressure immediately before releasing the finger 50 from the mechanical switch.

Therefore, the driving unit 41 gives vibrations corresponding to areas 61 and 62 illustrated in FIG. 4 to the panel 10 to give the same operational feeling as an operational feeling onto the mechanical switch to the user U. The area 61 is a predetermined range before and behind the operation position S2 at which the operating force has the minimum value. The area 62 is a range from the operation position S2, immediately before releasing the finger 50 of the user U from the mechanical switch, to the operation position S1.

Figure 5:
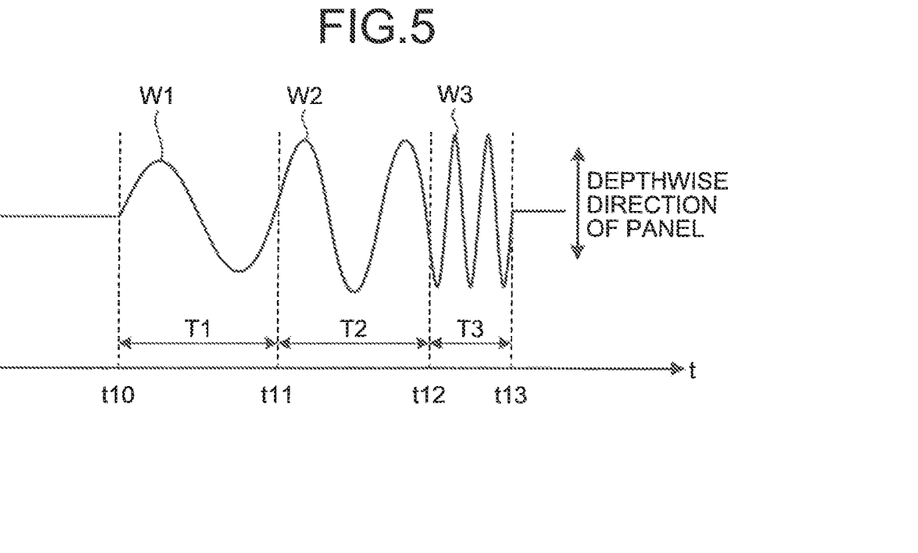
FIG. 5 is a diagram illustrating a specific example of a vibrational waveform of a panel.

FIG. 5 is a diagram illustrating an example of a vibration of the panel 10 generated by the driving unit 41. As illustrated in FIG. 5, when a user's operation is detected by the operation detecting unit 40, the driving unit 41 causes the panel 10 to generate the initial vibration W1 and then causes the panel 10 to generate the main vibration W2. After that, the driving unit 41 causes the panel 10 to generate a sound source vibration W3. The vibrations W1 to W3 are a vibration in a depthwise direction (Z-axis direction illustrated in FIG. 1) of the panel 10.

Herein, the sound source vibration W3 is a waveform to present an operational sound to the user U. The sound source vibration W3 is a waveform of a main frequency or an original sound that occurs during an operation of the mechanical switch as a simulated target. The sound source vibration W3 is a vibration having a higher frequency than that of the main vibration W2.

In other words, the sound source vibration W3 can allow the panel 10 to generate an operational sound when pushing down an actual mechanical switch. As described above, it is possible to give an operational feeling closer to a mechanical switch to the user U by presenting an operational sound of an actual mechanical switch. Furthermore, because the sound source vibration W3 vibrates the panel 10 to generate an operational sound, a separate speaker for generation an operational sound is not required.

In other words, cost reduction of the input system 1 can be achieved. In addition, a sound caused by the sound source vibration W3 is, for example, a clicky sound when pushing down the mechanical switch.

As described above, an operational feeling of a mechanical switch is presented by using the initial vibration W1 and the main vibration W2, and an operational sound of the mechanical switch is presented by using the sound source vibration W3. In other words, an operational feeling of the mechanical switch can be presented by using an acoustic sense as well as a tactile sense. Therefore, it is possible to give the same operational feeling as that of the mechanical switch to the user U.

The driving unit 41 causes the panel 10 to generate the vibrations W1 to W3 on the basis of the type of vibration modes set in the storage 21. It is preferable that the initial vibration W1 has a frequency not more than 300 MHz and a frequency in a range of ½ to ¼ of the main vibration W2.

Next, the fixed mode and the variation mode described above will be described. Hereinafter, it will be described in the order of the fixed and variation modes. First, the fixed mode will be described. In the fixed mode, the driving unit 41 can generate the vibrations W1 to W3 on the basis of the timing information 31 and the operation determination information 32 stored in the storage 21.

When the pressure of the user's operation is not less than the first threshold value Pth1 on the basis of the operation determination information 32 stored in the storage 21, the driving unit 41 detects that there is the operation of the user U onto the operation surface 15. Then, the driving unit 41 applies a sinusoidal driving voltage Vo1 to the vibration element 14 and causes the panel 10 to generate the initial vibration W1 until the first time T1 elapses from a detection timing (time t10) of the user's operation on the basis of the timing information 31 stored in the storage 21.

As a result, in times t10 to t11 (first time T1), the panel 10 is caused to generate the initial vibration W1 and thus the user U can be caused to feel a repulsive force when pushing the switch. Herein, the initial vibration W1 is not limited to the shape of a sine wave. Therefore, the initial vibration W1 may be the shape of a rectangle, a sawtooth wave, or a triangular wave.

Next, the driving unit 41 applies a sinusoidal driving voltage Vo2 to the vibration element 14 in the second time T2 between time t11 and time t12 on the basis of the timing information 31 stored in the storage 21. The driving voltage Vo2 is a voltage by which the frequency of the vibration element 14 becomes higher than the driving voltage Vo1.

As a result, a click feel can be given to the user U by instantaneously giving vibrations having relatively different frequencies to the user U. Furthermore, it is preferable that the main vibration W2 has a comparatively short time. For example, the main vibration W2 is a vibration within two periods of a sine wave. In other words, even if a sound is output from the panel 10 due to the main vibration W2, the output time is short.

Therefore, a sound output from the panel 10 can be restrained within the range in which the user U cannot recognize the sound. As a result, the user U can avoid getting an unpleasant feeling.

As described above, the driving unit 41 continuously generates the initial vibration W1 and the main vibration W2. As a result, the driving unit 41 can give a repulsive force according to a mechanical switch to the user U and further give a click feel to the user U. In other words, it is possible to give the same operational feeling as that of an actual mechanical switch. Herein, "continuously generating the initial vibration W1 and the main vibration W2" means that the initial vibration W1 and the main vibration W2 are generated seamlessly as illustrated in FIG. 5, but includes generating the initial vibration W1 and the main vibration W2 at short intervals.

Next, the driving unit 41 applies a driving voltage Vo3 to the vibration element 14 to generate the sound source vibration W3 in the third time T3 between time t12 and time t13 on the basis of the timing information 31 stored in the storage 21. The driving voltage Vo3 is a voltage by which the frequency of the vibration element 14 becomes higher than the driving voltage Vo2.

As described above, the sound source vibration W3 is a vibration for presenting an operational sound of the mechanical switch to the user U. Furthermore, the sound source vibration W3 is, for example, a frequency at which the finger 50 of the user U cannot feel a vibration.

In other words, the initial vibration W1 and the main vibration W2 are vibrations for presenting an operational feeling of the mechanical switch to the user U by using a tactile sense, and the sound source vibration W3 is a vibration for presenting an operational sound to the user U by using an acoustic sense.

As described above, in the fixed mode, the driving unit 41 can apply to the vibration element 14 driving voltages Vo respectively corresponding to the first to third times T1 to T3 according to the timing information 31 on the basis of the timing information 31 stored in the storage 21 so as to give the same operational feeling as an operational feeling onto the mechanical switch to the user U.

Figure 6:
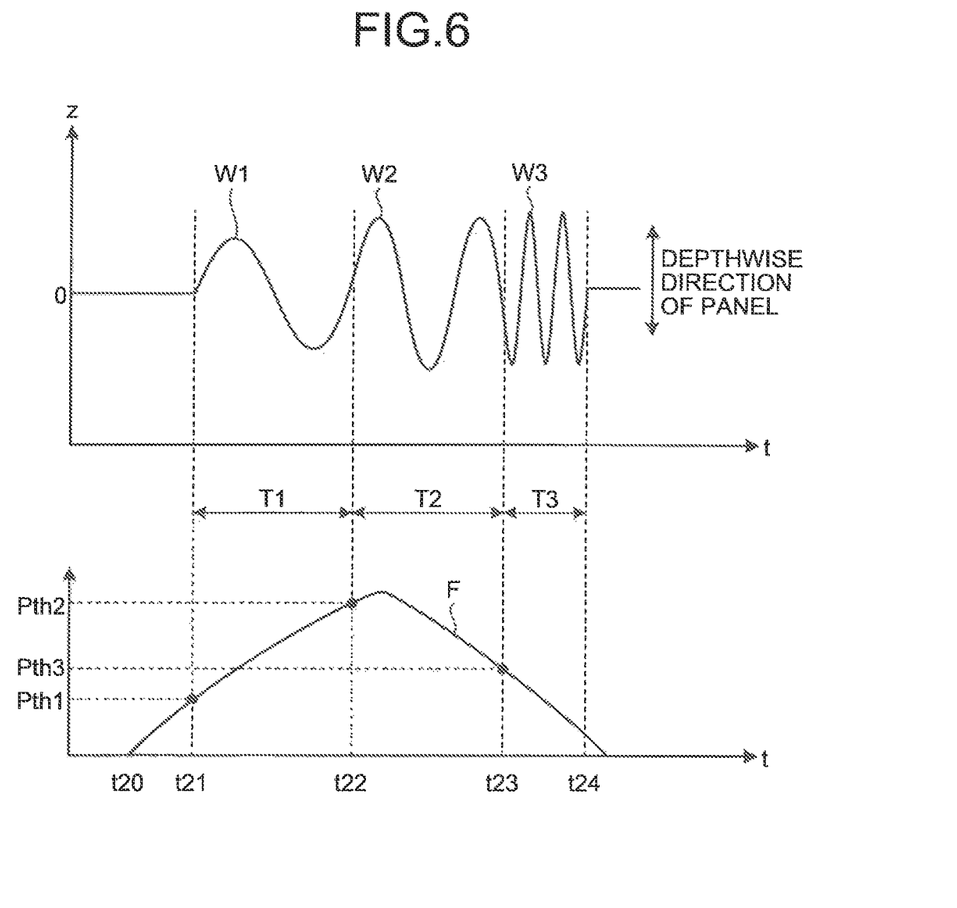
FIG. 6 is a diagram illustrating a relationship between a vibration and an operational pressure of the panel.

Next, the variation mode will be described. In the variation mode, the driving unit 41 generates the vibrations W1 to W3 on the basis of an operational pressure F onto the operation surface 15 detected by the pressure sensor 13 and the operation determination information 32 stored in the storage 21.

FIG. 6 is a diagram illustrating a relationship between the vibration of the panel 10 and the operational pressure F of the user U onto the operation surface 15 in the variation mode. In the example illustrated in FIG. 6, the user U starts a pressing operation at time t20, and then the operational pressure F of the user U onto the operation surface 15 is increased.

The driving unit 41 repeatedly determines whether the operational pressure F is not less than the first threshold value Pth1. When it is determined that the operational pressure F is not less than the first threshold value Pth1 (time t21), the driving unit 41 applies the driving voltage Vo1 to the vibration element 14. As a result, the driving unit 41 causes the panel 10 to generate the initial vibration W1.

Next, the driving unit 41 determines whether the operational pressure F is not less than the second threshold value Pth2 or is less than the first threshold value Pth1. When it is not determined that the operational pressure F is not less than the second threshold value Pth2 or is less than the first threshold value Pth1, the driving unit 41 continues to apply the driving voltage Vo1 to the vibration element 14.

As a result, the driving unit 41 can cause the panel 10 to continuously generate the initial vibration W1 so as to more appropriately give the user U a repulsive force when pushing the switch.

When the operational pressure F is not more than the first threshold value Pth1, the driving unit 41 sets a voltage to be applied to the vibration element 14 to zero to stop the vibration of the panel 10. On the other hand, when it is determined that the operational pressure F is not less than the second threshold value Pth2 (time t22), the driving unit 41 applies the driving voltage Vo2 to the vibration element 14 within the second time T2 (between time t22 and time t23). As a result, the driving unit 41 can cause the panel 10 to generate the main vibration W2 so as to give a click feel to the user U.

Next, the driving unit 41 determines whether the operational pressure F is not more than the third threshold value Pth3. When it is determined that the operational pressure F is not more than the third threshold value Pth3 (time t23), the driving unit 41 applies the driving voltage Vo3 to the vibration element 14 within the third time T3 (between time t23 and time t24). As a result, an operational sound can be presented to the user U.

As described above, in the variation mode, the driving unit 41 generates the vibrations W1 to W3 on the basis of the operational pressure F of the user U onto the operation surface 15 of the panel 10 and the operation determination information 32 stored in the storage 21. For that reason, even if the operational pressure F and the contact time in the pressing operation are different between users, a suitable operational feeling for each of the users can be given.

Figure 7:
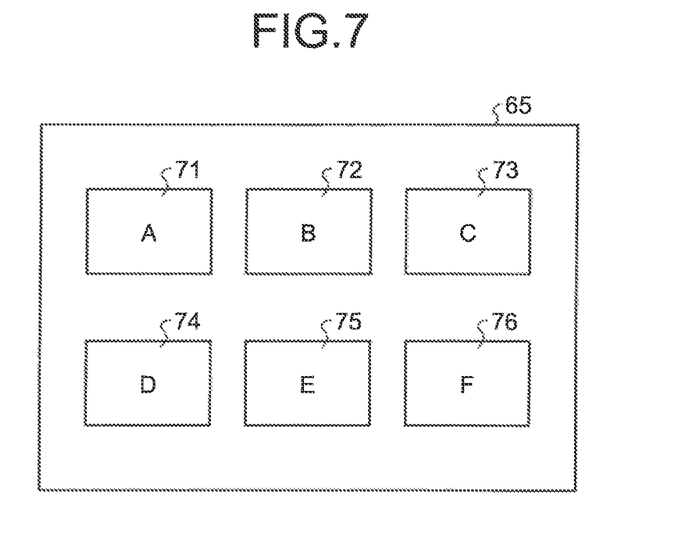
FIG. 7 is a diagram illustrating an example of a screen that is displayed on a display device.

Next, a relationship between an image displayed on the display device 2 and an input operation of the user U will be described. FIG. 7 is a diagram illustrating an example of a screen 65 that is displayed on the display device 2. The screen 65 illustrated in FIG. 7 is a menu screen that is displayed on the display device 2. Six icons 71 to 76 (hereinafter, may be collectively referred to as "icon 70") are displayed on the menu screen.

When the user U performs a pressing operation for selecting the icon 70 with respect to the operation surface 15, the driving unit 41 causes the panel 10 to sequentially generate the vibrations W1 to W3 described above.

Herein, the operation determination information 32 in the storage 21 includes, for each of the six icons 71 to 76, different combination information of the vibrations W1 to W3, the first to third threshold values Pth1 to Pth3, and the first to third times T1 to T3.

In other words, when a pressing operation onto the icon 70 is detected, the driving unit 41 can generate the vibrations W1 to W3 and change the vibrations W1 to W3 for each the icon 70.

As described above, a different feel for each the icon 70 can be given to the user U by generating the different vibrations W1 to W3 for each the icon 70. As a result, the user U can be caused to recognize an operation onto each the icon 70 by using a difference of a tactile sense so as to improve operationality. Vibrations for the six icons 71 to 76 may be all the same vibrations W1 to W3.

Figure 8:
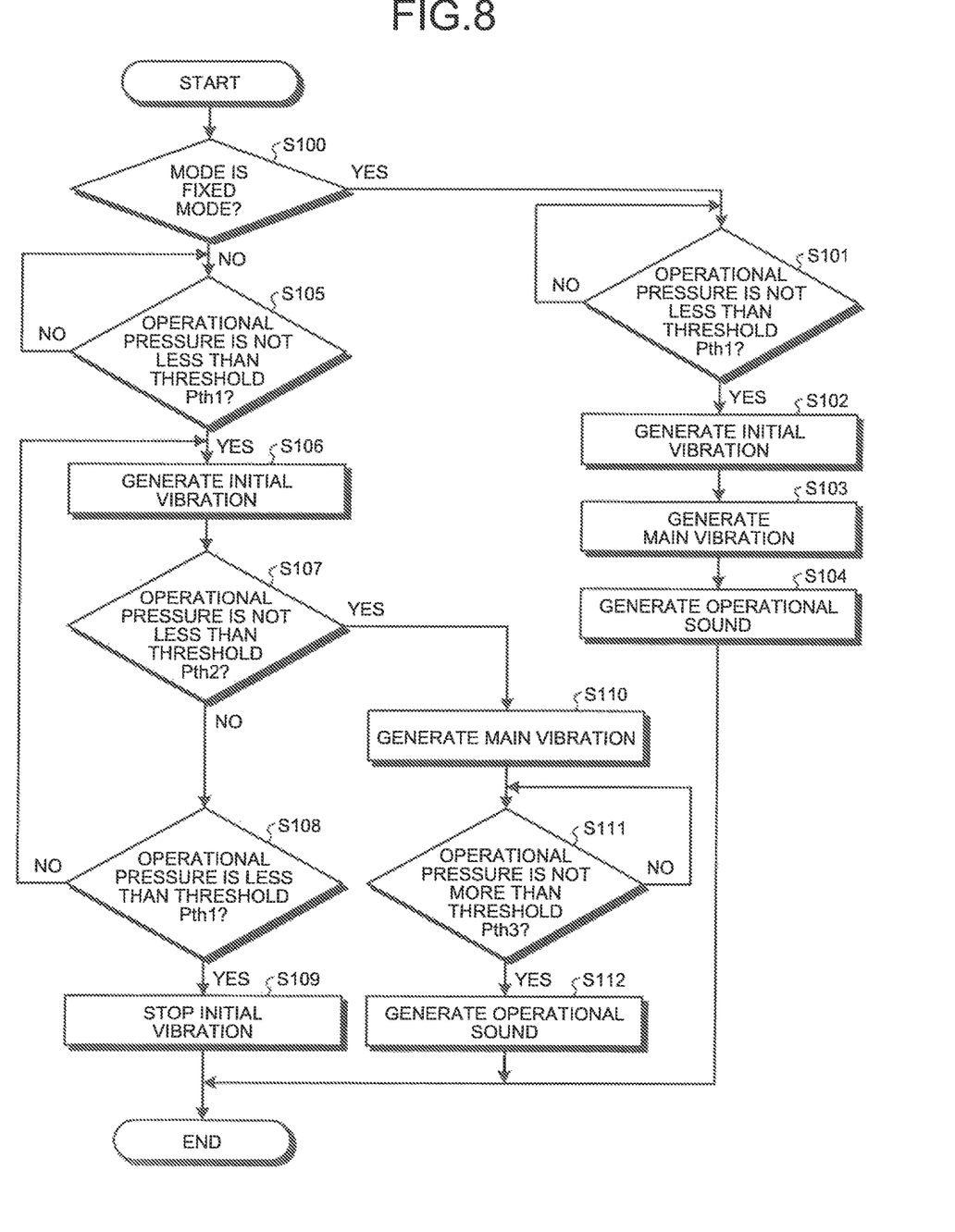
FIG. 8 is a flowchart illustrating a processing procedure that is executed by a control device.

Next, a processing procedure that is executed by the control device 20 according to the embodiment will be described by using FIG. 8. FIG. 8 is a flowchart illustrating a processing procedure that is executed by the control device 20. A processing procedure to be described below is performed by the controller 22 of the control device 20.

As illustrated in FIG. 8, the controller 22 first determines whether a mode is a fixed mode (Step S100). When the mode is the fixed mode (Step S100: Yes), the controller 22 determines whether the operational pressure F is not less than the threshold value Pth1 (Step S101).

When the operational pressure F is not less than the threshold value Pth1 (Step S101: Yes), the driving unit 41 generates the initial vibration W1 (Step S102) and then generates the main vibration W2 (Step S103). After that, the driving unit 41 generates the sound source vibration W3 to generate an operational sound (Step S104), and terminates the process. Furthermore, when the operational pressure F is less than the threshold value Pth1 (Step S101: No), the controller 22 repeatedly performs the process of Step S101.

On the other hand, when the mode is not the fixed mode (Step S100: No), the controller 22 determines whether the operational pressure F is not less than the threshold value Pth1 (Step S105). When the operational pressure F is less than the threshold value Pth1 (Step S105: No), the controller 22 continues to perform the process of Step S105.

Furthermore, when the operational pressure F is not less than the threshold value Pth1 (Step S105: Yes), the driving unit 41 generates the initial vibration W1 (Step S106), and determines whether the operational pressure F is not less than the threshold value Pth2 (Step S107).

When the operational pressure F is less than the threshold value Pth2 (Step S107: No), the controller 22 determines whether the operational pressure F is less than the threshold value Pth1 (Step S108). Herein, when the operational pressure F is less than the threshold value Pth1 (Step S108: Yes), the controller 22 stops the initial vibration W1 (Step S109) and terminates the process. Furthermore, when the operational pressure F is not less than the threshold value Pth1 (Step S108: No), the controller 22 continues to perform the process after Step S106.

On the other hand, when the operational pressure F is not less than the threshold value Pth2 (Step S107: Yes), the driving unit 41 generates the main vibration W2 (Step S110) and determines whether the operational pressure F is not more than the threshold value Pth3 (Step S111).

When the operational pressure F is not more than the threshold value Pth3 (Step S111: Yes), the driving unit 41 generates the operational sound (S112) and terminates the process. Furthermore, when the operational pressure F is larger than the threshold value Pth3 (Step S111: No), the controller 22 continues to perform the determination process of Step S111.

As described above, the control device 20 according to the embodiment includes the operation detecting unit 40 and the driving unit 41. The operation detecting unit 40 detects a pressing operation onto the operation surface 15 of the panel 10 having the operation surface 15. The driving unit 41 drives the vibration element 14 attached to the panel 10 to vibrate the panel 10. Furthermore, when the pressing operation is detected by the operation detecting unit 40, the driving unit 41 generates the initial vibration W1 having a lower frequency than that of the main vibration W2 in advance of the main vibration W2. Therefore, the control device 20 according to the embodiment can give the same operational feeling as an operational feeling onto a mechanical switch to the user U and thus can improve an operational feeling to be given to the user U.

A case where the vibration element 14 generates the vibrations W1 to W3 in a depthwise direction of the panel 10 has been explained in the embodiment described above. However, the present embodiment is not limited to this. In other words, the embodiment can be applied to a case where the vibration element 14 vibrates the panel 10 along an X-axis direction or a Y-axis direction illustrated in FIG. 1A.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A control device comprising:
    a processor programmed to:
        detect a pressing operation onto an operation surface of a panel, the panel including the operation surface;
        drive a vibrator attached to the panel to vibrate the panel;
        when detecting that the pressing operation is a continuous pressing operation in which a contact position on the operation surface continues to be at a same position, drive the vibrator to generate an initial vibration having a lower frequency than a frequency of a main vibration in advance of the main vibration; and
        drive the vibrator to generate, after the main vibration, a subsequent vibration having a higher frequency than the frequency of the main vibration.

2. The control device according to claim 1, wherein the processor is further programmed to:
    continuously generate the initial vibration and the main vibration.

3. The control device according to claim 1, wherein the processor is further programmed to:
    detect the pressing operation based on an operational pressure onto the panel, and
    drive the vibrator to generate the initial vibration when the detected operational pressure exceeds a first threshold value, and switch from the initial vibration to the main vibration when the operational pressure exceeds a second threshold value that is larger than the first threshold value.

4. The control device according to claim 1, wherein the subsequent vibration after the main vibration generates an operational sound from the panel, the subsequent vibration after the main vibration having the higher frequency that is within an audible range.

5. The control device according to claim 4, wherein the processor is further programmed to:
    drive the vibrator to generate the operational sound with a waveform of one of (i) an original sound occurring during an operation of a mechanical button that is a simulated target of a tactile sense to be provided to a user via the operation surface and (ii) a main frequency component of the original sound.

6. An input system comprising:
    the control device according to claim 1;
    the panel that includes the operation surface; and
    the vibrator that vibrates the panel.

7. The control device according to claim 1, wherein the processor is further configured to:
    detect the pressing operation based on an operational pressure onto the panel, and
    when the detected operational pressure exceeds a first threshold value, drive the vibrator to generate the initial vibration for a first time interval; drive, after the initial vibration, the vibrator to generate the main vibration for a second time interval; and drive, after the main vibration, the vibrator to generate the subsequent vibration having the higher frequency than the frequency of the main vibration, for a third time interval.

8. A control method comprising:
    detecting a pressing operation onto an operation surface of a panel, the panel including the operation surface;
    driving a vibrator attached to the panel to vibrate the panel, the driving including driving, when detecting that the pressing operation is a continuous pressing operation in which a contact position on the operation surface continues to be at a same position, the vibrator to vibrate the panel at an initial vibration having a lower frequency than a frequency of a main vibration in advance of the main vibration; and
    driving the vibrator to generate, after the main vibration, a subsequent vibration having a higher frequency than the frequency of the main vibration.

* * * * *